United States Patent [19]
Hawkes

[11] Patent Number: 5,835,530
[45] Date of Patent: Nov. 10, 1998

[54] BIT CHARACTERISTICS MEASUREMENT SYSTEM FOR DIGITALLY MODULATED SIGNALS

[75] Inventor: Kelly Davidson Hawkes, Los Altos, Calif.

[73] Assignee: Corsair Communications, Inc., Palo Alto, Calif.

[21] Appl. No.: 729,486

[22] Filed: Oct. 11, 1996

Related U.S. Application Data

[63] Continuation-in-part of Ser. No. 576,115, Dec. 21, 1995, abandoned.

[51] Int. Cl.$^6$ .................................................. H04B 17/02
[52] U.S. Cl. ........................ 375/225; 375/224; 455/410; 455/415
[58] Field of Search .................................. 375/224, 225, 375/316, 320, 377; 371/5.1, 340; 455/410, 67.1, 415

[56] References Cited

U.S. PATENT DOCUMENTS

| | | | |
|---|---|---|---|
| 4,559,602 | 12/1985 | Bates, Jr. | |
| 5,005,210 | 4/1991 | Ferrell | 455/115 |
| 5,327,144 | 7/1994 | Stilp et al. | 342/387 |
| 5,329,591 | 7/1994 | Magrill | 380/25 |
| 5,369,682 | 11/1994 | Witsaman | 379/57 |
| 5,448,760 | 9/1995 | Frederick | 455/410 |
| 5,724,389 | 12/1997 | Marko et al. | 375/225 |

Primary Examiner—Wellington Chin
Assistant Examiner—Congvan Tran
Attorney, Agent, or Firm—David E. Lovejoy

[57] ABSTRACT

System for measurement of the bit period (or bit rate or baud rate or symbol rate) and bit epoch (or symbol epoch) of a digitally modulated signal by extracting a bit time-of-transition array, determining an emphasis array with individual elements thereof relating to corresponding elements of the bit time-of-transition array, and using linear regression on the bit time-of-transition array with the emphasis. The emphasis array is formed from the signal amplitude, signal to interference ratio, or probability of a bit not being in error. One of several matched filters is dynamically selected based on the data content of the signal and used to detect bit transitions. The system has application in time varying multi-path fading environments. The system operates on signals with low SNR, high co-channel interference, or high intersymbol interference. Useful in transmitter identification, range finding, mobile transmitter location, and frequency hop intercept systems.

26 Claims, 6 Drawing Sheets

BIT CHARACTERISTICS MEASUREMENT SYSTEM FOR DIGITALLY MODULATED SIGNALS

This application is a continuation-in-part of Ser. No. 8/576,115 filed Dec. 21, 1995 now abandoned.

BACKGROUND OF THE INVENTION

This invention relates to the measurement of bit characteristics, such as bit rate and bit epoch, of digitally modulated signals from transmitters, such as cellular phone transmitters, in order to identify unauthorized cloned cellular phones, to determine the location of mobile transmitters and to perform other functions.

The bit characteristics of digitally modulated signals include one or more of the following quantities: bit rate which is the number of bits transmitted in a time interval, bit epoch which is the time when a specific bit is received and bit period which is the reciprocal of bit rate.

Conventional Cellular Systems

In conventional cellular telephone systems, a potentially large number of cellular phones are located in one or more cells and each cellular phone has two-way radio frequency (RF) communication with a base station (BTS). Each cellular phone has an RF receiver for receiving forward channel communications from the base station and a transmitter for transmitting reverse channel communications to the base station. The forward and reverse channel communications use separate frequency bands so that simultaneous transmissions in both directions are possible. This operation is referred to as frequency domain duplex (FDD) signaling. The cellular Advanced Mobile Phone System (AMPS) currently in use in the United States employs frequency division multiple access (FDMA) communications between base stations and mobile cellular telephones. Cellular mobile telephone systems "reuse" frequency from cell to cell to provide wireless two-way RF communication to large numbers of cellular phones. Each cell covers a small geographic area and collectively groups of adjacent cells cover a larger geographic region.

In conventional cellular systems, base station controllers (BSC) monitor and control one or more base stations. The number of base stations controlled typically is between several tens and several hundreds. The principal tasks of the base station controllers are frequency administration, the control of a base station, and exchange functions. The base station controllers assign RF carriers to support calls, coordinate the handoff of cellular phones between base stations, and monitor and report on the status of base stations. The base station controllers can be located at the same site as the base stations or at a different site. Base station controllers and base stations together form a functional unit referred to as the base station subsystem (BSS).

In conventional cellular systems, a mobile services switching center (MSC) is the interface between the cellular system and the public switched telephone network (PSTN). The MSC is a switching exchange (switch) for routing calls from the fixed PSTN network through the base station controllers (BSC) and the base stations (BTS) to individual cellular phones. The MSC switch provides the network with data about individual mobile cellular phones.

In conventional cellular systems, the operation and maintenance center (OMC) has access to both the MSC switches and the base station controllers in order to process error messages coming from the network and to control the traffic load of the BSC controllers and the BTS base stations. The OMC configures the BTS base stations through the BSC and allows components of the system to be checked.

Conventional Cellular Phone Reverse Control Channel (RECC) Transmissions.

For RECC transmissions, the modulator in a typical cellular phone is capable of synthesizing three frequencies: low, center, and high. Normally, the low frequency is 8 kHz lower than the RECC center frequency and the high frequency is 8 kHz greater than the RECC center frequency. The digital modulation is frequency shift keyed (FSK) and pre-carrier and post-carrier (unmodulated carrier present before and after the FSK modulation) are usually at the center frequency. A binary 1 is represented by a 50 $\mu$s transmission at the low frequency followed by a 50 $\mu$s burst at the high frequency. A binary 0 is represented by a 50 $\mu$s transmission at the high frequency followed by a 50 $\mu$s burst at the low frequency. A single bit is 2×50 $\mu$s=100 $\mu$s (¹/₁₀ kHz). After filtering and amplification, the high or low voltages cause an oscillator to shift in frequency ±8 kHz. The oscillator FSK modulates an RF local oscillator signal tuned to one of the control channel frequencies (the RECC center frequency) determined by the channel number input. The digital modulation uses Manchester encoding which transmits a "1" baud followed by a "0" baud for a "0" bit and transmits a "0" baud followed by a "1" baud for a "1" bit. Manchester encoding has a baud transition at the center of each bit and sometimes at the edges of the bit. Manchester encoding has a baud rate twice the bit rate. For non-binary signaling, the time of transition (TOT) is the time when the signal transitions from one symbol to another symbol. For Manchester encoding, the TOT can either be the time of transition of the bauds or the time of the center of each bit.

The circuit components and processes used to manufacture cellular phones vary from one cellular phone to another even for the same manufacturer giving rise to unique parameters, such as the actual timing of each bit used in the RECC transmissions, for each cellular phone.

Dual-mode digital cellular phones use the AMPS protocol to communicate with the BTS on the RECC, and therefore operations using the RECC are also applicable to such digital cellular phones.

Cloned Cellular Phones

Cloned cellular phones are cellular phones that have been illegally programmed or that otherwise have made unauthorized use of MIN/ESN identification codes of legitimate cellular phones. Bit rate measurements and other parameters are derived from intercepts of transmissions from cellular phones. To be effective in detecting cloned phones, transmitter identification systems must have parameters such as bit characteristics measurements with low variance from intercept to intercept for the same cellular phone transmitter and being substantially different from one cellular phone transmitter to another.

Bit Characteristics Measurements

The following publications are useful in understanding linear regression, bit characteristics measurements of digitally modulated signals, and the FM threshold effect respectively:

(i) William H. Press, Brian P. Flannery, Saul A. Teukolsky, and William T. Vetterling, "Numerical Recipes, The Art of Scientific Computing," Cambridge University Press, 1986, particularly Chapter 14, pages 504–546 (hereinafter Press);

(ii) Thomas A. Reglein, "Feature Selection for the Identification of Bauded Signals," Thesis from the Naval Post Graduate School, Monterey, Calif., March 1975, particularly pages 34–72 (hereinafter Reglein); and (iii) Bruce A. Carlson, "Communication Systems, An Introduction to Signals and Noise in Electrical Communication," Third Edition, 1986, McGraw-Hill, particularly pages 334–337 (hereinafter Carlson).

In general, prior art bit characteristics measurement techniques include the detection steps of receiving and demodulating the signal and include the post-detection steps of correlation filtering to highlight bit transitions, determining the time of each bit transition, and then curve fitting techniques, such as linear regression on a bit time-of-transition array, to estimate the bit rate.

Disturbances to RF Signals

For frequency-shift-keyed (FSK) digitally modulated signals typical of wireless communications, demodulation is performed by a frequency discriminator. Carlson indicates that frequency discriminators require at least a +10 dB input signal-to-noise power ratio (SNR) due to the frequency modulation (FM) threshold effect. Prior art systems are limited to processing only medium to high SNR signals because the FM demodulator used in such systems performs a non-linear operation prior to the step correlation filter.

For high frequency (HF) communications, the transmitter and the receiver may be a great distance apart and still communicate by using the ionosphere as a reflector. The height of the ionosphere above the earth varies with the time of day due to the light from the sun which ionizes the air in the ionosphere. There are several layers in the ionosphere that reflect radio waves. As the height of the ionosphere changes with time, so do the various path lengths. Consequently, multi-path fading of HF signals is usually time-varying.

For cellular telephone communications, any metallic structures within about 100 feet of the cellular phone act as active reflectors. Similarly, the ground about the cellular phone also reflects radio waves. If a cellular phone is mobile, or the structures near the cellular phone are mobile, the path lengths from the mobile transmitter to the cellular base-station receiving antenna vary with time. Therefore the Manchester encoding FSK signals from the cellular units to the base-station experience time-varying, multi-path fading.

Multi-path propagation results when there are multiple paths that a radio wave takes between a transmitter and a receiver due to any cause. When the radio signal propagates from the cellular phone transmitter to the base station receiver, it often is distorted by multi-path propagation which may be manifested as deep fades. The waves from the various multiple paths combine at the receiving antenna and may add constructively or destructively, depending on the difference in the path lengths. When they add destructively, the received signal experiences a fade. During a fade, the signal-to-noise power ratio drops and the demodulator may be operating principally on noise rather than on the received signal resulting in errors to the time-of-transition (TOT) measurement.

Prior art methods of making TOT measurements produce substantial TOT jitter when there is substantial inter-symbol interference (ISI). Inter-symbol interference occurs when the modulating signal is lowpass filtered or the transmitted signal is bandpass filtered. The degree of ISI is proportional to the ratio of the bit rate to the filter bandwidth. The filtering in the transmitter causes the energy of one bit transition to be smeared in time so that it overlaps with the next bit transition. Prior art methods of analyzing TOT tended to make the amount of ISI appear to increase and thereby distort the analysis. Short-step correlation filters have low ISI but only operate down to a medium SNR. By contrast, long-step correlation filters have high ISI but are able to process low SNR intercepts. Noise or ISI corrupts the analysis of TOT in a manner that tends to limit the effectiveness of prior art techniques. Prior art step correlation filters are typically one bit long and may increase to two bits long where there is little ISI.

Client Systems Using Parameters.

Bit rate and bit epoch measurements are useful in identifying unauthorized clone phones, in determining the location of mobile cellular phones within cells, in the sorting of frequency hops of one transmitter from those of another, and in performing other client functions. A client is a system that uses bit rate, bit epoch or other bit characteristics measurements.

The "Cellular Telephone Anti-Fraud System" of U.S. Pat. No. 5,448,760 uses the RECC bit values to determine the MIN/ESN (cellular phone number) and uses the bit rate measurement to determine if a cellular telephone is authorized or is cloned and should be denied access to the cellular telephone network.

Parameters are used in the "Transmitter Identification and Validation System" of U.S. Pat. No. 5,329,591 and in the "Fraud Prevention System" of the above-identified cross-referenced application to detect unauthorized access to a cellular telephone network by cloned cellular phones.

Client systems performing range finding or mobile transmitter location use bit values to identify transmitters and bit epoch to determine the time that a signal from a transmitter arrives at one of several cell sites and thereby assist in finding the locations of the transmitters using time-difference-of-arrival (TDOA) techniques. To be effective in determining the location of mobile cellular phones, accurate bit epoch measurement is required. Time-difference-of-arrival techniques are described by Stilp et al. in U.S. Pat. No. 5,327,144.

A client system can perform sorting of frequency hopped transmissions using the bit values to recover the transmitted information and the bit epoch to separate the frequency hops of one transmitter from the frequency hops of another.

While many prior art techniques have been proposed or used in connection with client functions, prior art methods of bit characteristics measurements for digitally modulated signals have been limited in accuracy and effectiveness so that the performance of client functions have not been entirely satisfactory.

In accordance with the above background, there is a need for improved bit characteristics measurements and client systems based upon such improved bit characteristics measurements.

SUMMARY OF THE INVENTION

The present invention measures bit characteristics, such as bit rate and bit epoch, of digitally modulated signals. It operates on signals that have been corrupted by time varying multi-path RF propagation, on weak signals as well as on those with low signal-to-noise power ratio, and on signals corrupted by co-channel interference.

The present invention measures bit characteristics by extracting symbol time-of-transition elements, $y_i$, from the digitally modulated signal to form a symbol time-of-transition array and by extracting symbol transition number elements, $x_i$, from the digitally modulated signal to form a symbol number array. Emphasis elements, $e_i$, are determined from the digitally modulated signal to form an emphasis array with each emphasis element having a corresponding time-of-transition element. Processing is performed using linear regression on the symbol time-of-transition array and the symbol number array together with the emphasis array to determine the bit characteristics.

In a transmitter identification system, the measurement of bit rate of transmitters permits the identification system to distinguish among transmitters, provided that the bit rates of the transmitters are sufficiently different and the bit rate measurement error is small compared to the differences in bit rates. This invention has a low measurement error and therefore is useful in transmitter identification systems.

In a range finding system, the transmitter sends a digital communication message at a specific time. A receive site intercepts the transmission and determines the absolute time that a specific bit was received (this constitutes a measurement of the bit epoch). The difference in time from when the transmitter sent the message and when a specific bit was received permits the calculation of the distances between the transmitter and the receiver. This invention measures the bit epoch precisely, thereby permitting the range error to be small.

In a mobile transmitter location system, the transmission is intercepted by several widely separated antennas. The bit epoch is measured on the signals collected by the various antennas and converted into absolute time. The time difference in the bit epochs is the time difference of arrival. Techniques of determining the intersection of hyperbolas of constant time difference of arrival permit the system to locate the mobile transmitter.

In a sorting system that intercepts frequency hopped transmissions, the bit epoch of each transmission burst can be measured. If the bit epochs of two bursts are an integral number of bits apart, it can be assumed that the bursts come from the same transmitter.

The foregoing and other objects, features and advantages of the invention will be apparent from the following detailed description in conjunction with the drawings.

DESCRIPTION

Figure 1:
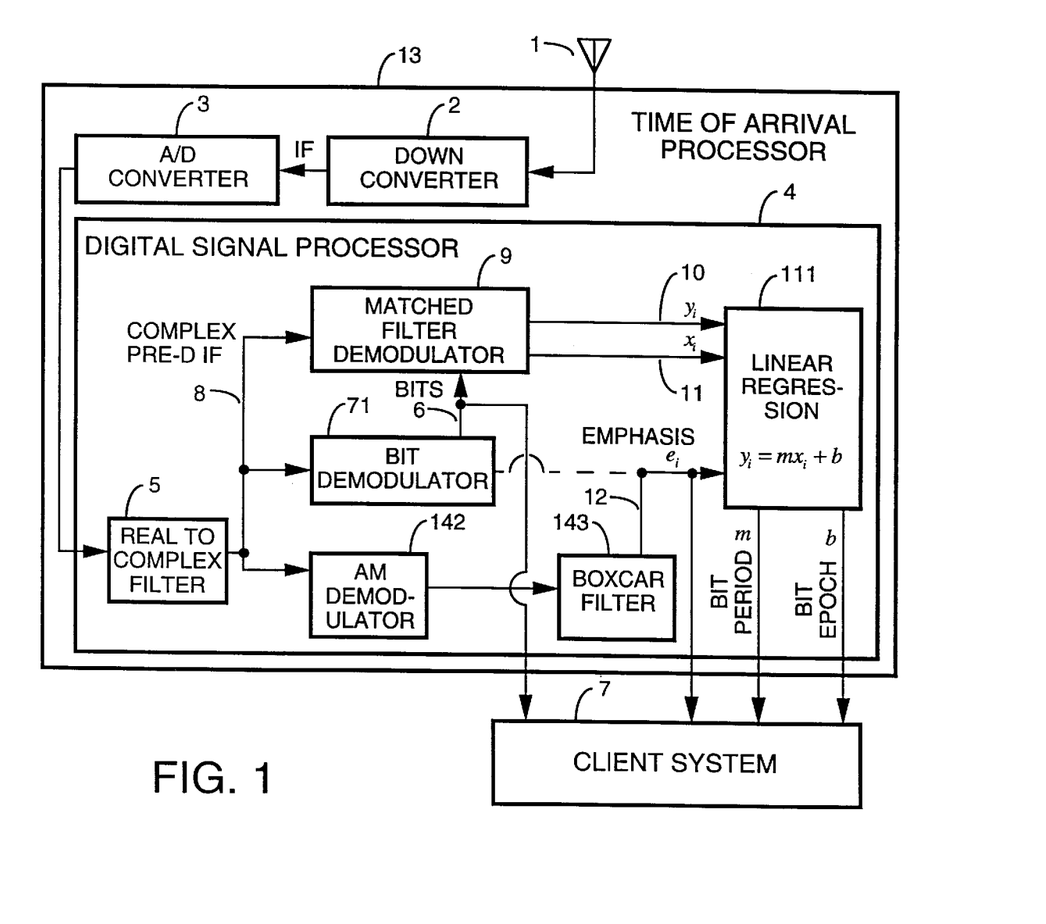
FIG. 1 is a block diagram of a time-of-arrival processor used to measure the bit period and bit epoch used in conjunction with a client system and a receive antenna.

Measurement System—FIG. 1

FIG. 1 shows one preferred embodiment of a bit characteristics measurement system according to the present invention. A receive antenna 1 intercepts an RF signal from an RF transmitter. For sonar or acoustic systems, the antenna 1 is replaced by an appropriate sound transducer. The down converter 2 in time-of-arrival processor 13 selects a narrowband portion of the spectrum of the received digitally modulated signal, amplifies it, and frequency translates it, forming a pre-detection intermediate frequency (IF) output signal. An analog-to-digital (A/D) converter 3 samples the IF signal at regular intervals and represents the IF signal samples in the form of a sequence of numbers. The samples from the A/D converter 3 are sent to a digital signal processor 4. Signal processor 4 is efficient in performing signal processing. The signal processing functions of processor 4 can be allocated to either hardware or software and the allocation will be readily apparent to those skilled in the art.

In one preferred embodiment, the signal processing in processor 4 of FIG. 1 is implemented by software. The real-to-complex filter 5 is a polyphase finite impulse response (FIR) filter that frequency shifts the IF samples to 0 Hz and lowpass filters the shifted samples forming an in-phase and a quadrature representation referred to as the complex pre-detection IF signal 8. A bit demodulator 71 operates on the complex pre-detection IF signal 8 to recover the bit values and a course bit time when each bit occurs as represented by bit signals 6. The complex pre-detection IF samples are assigned sequential numbers and the coarse bit time is the sample number nearest to the beginning of the bit.

In general, digital communication signals may encode one or more bits into a symbol. For example, one bit per symbol is used for two-level frequency-shift-keyed modulation. Two bits per symbol are used for quadrature-phase-shift-keyed (QPSK) modulation. For simplicity of explanation and for clarity, this invention is described in terms of bits (meaning one bit per symbol), bit number, sample number (the number nearest to the beginning of a bit) and bit time of transition. However, the extension of the description from a bit to a symbol and of bit period and bit epoch measurements to symbol period and symbol epoch measurements for generic modulations with one or more bits per symbol is readily apparent by simply replacing bit with symbol as follows: symbol number, sample number (sample nearest to the beginning of a symbol) and symbol time of transition.

A bit is a binary digit consisting of either the logical "0" bit or the logical "1" bit. A baud is the smallest time interval of a signal where the modulation is relatively constant. Frequency-shift-keyed (FSK) modulation has one bit per baud and, at any given time, transmits at one of $2^1=2$ different frequencies. Manchester encoding has 2 bauds per bit and uses a "1" baud followed by a "0" baud to represent a logical "0" bit and a "0" baud followed by a "1" baud to represent a logical "1" bit. Diplex-frequency-shift-keyed (DFSK) modulation has 2 bits per baud and transmits one of $2^2=4$ different frequencies. A symbol is the waveform used to convey information and represents one or more bits. One or more bits are encoded per symbol. Amplitude-shift-keyed (ASK) modulation has two different symbols, a carrier or the absence of a carrier. FSK has two different symbols, a waveform at a high frequency or a waveform at a low frequency. Manchester encoding has 2 symbols: a "1" baud followed by a "0" baud and a "0" baud followed by a "1" baud. DFSK has 4 different symbols, one for each frequency and has 2 bits per symbol. Quadrature-phase-shift-keyed (QPSK) modulation has 2 bits per symbol, each symbol being a different sinusoidal waveform with relative phases of 0°, 90°, 180°, or 270°.

A digitally modulated signal, on a periodic basis, transmits one of several symbols. A digitally modulated signal from a transmitter that is functioning properly consists of a time sequence of symbols with each symbol having the same time duration. A symbol time-of-transition table is a list containing the time when each symbol occurred, or the time when a symbol transition occurred. A symbol transition occurs between two symbols adjacent in time that have different symbol values. For example, when a FSK signal goes from a high frequency to a low frequency, a symbol transition is said to occur. Symbol period is the time duration of a symbol. Symbol rate is the number of symbols transmitted in a given time interval. Symbol rate is the reciprocal of symbol period. Symbol epoch is the time when a particular symbol of the digitally modulated signal is received. Digital communication protocols often use a fixed symbol sequence at the onset of the transmission to permit the framing of the symbol stream into bytes, characters, lines or frames. Any specific symbol can be selected for a fixed format communication message; it is only important to consistently identify the same symbol of the message from intercept to intercept. For example, the cellular telephone reverse control channel message consists of 30 symbols of dotting, 11 symbols of synchronization, 7 symbols of digital color code, and 240K symbols of information where K is the number of words in the message. The symbol epoch for this message is typically defined as the time when the first symbol of the synchronization sequence is received.

In accord with the above explanation, bit characteristics in the present application typically include one or more of the following: bit period, bit rate, bit epoch, baud period, baud rate, baud epoch, symbol period, symbol rate, and symbol epoch. The bit period, symbol period, baud period, bit rate, symbol rate, and baud rate are all mathematically related so that the computation of one is equivalent to the computation of any of the others.

In FIG. 1, the matched filter demodulator 9 operates on the complex pre-detection IF signal 8 to determine a bit time-of-transition (TOT) array 10 including the bit time-of-transition elements, $y_i$, and a bit transition number array 11 including the bit transition number elements, $x_i$. The matched filter demodulator 9 operates to examine the bit sequence of the input 8 for bit transitions between the current and the previous bit. When the current and the previous bits are different, a four-bit index is formed from the second previous bit, previous bit, current bit, and next bit. The bit index also takes into account the number of bits per symbol for non-binary modulations. This index is used to look up a set of filter coefficients. These filter coefficients are selected so that when the complex pre-detection IF waveform 8 is FIR filtered with these coefficients at filter taps, the output of the filter is maximized when the input signal is time aligned with the center. The matched filter demodulator 9 also determines the fractional sample number of the bit transition and the result is placed in the TOT array 10. The time duration of the matched filter is typically three bits long and up to four bits long when there is little ISI. The variance in the TOT elements, due to noise, will be three times smaller for a three-bit long matched filter when contrasted with a one-bit long step correlation filter. The matched filter demodulator has an even larger SNR improvement when taking into account the FM threshold effect. This invention does not introduce any non-linearity until after the filtering and therefore does not suffer from the FM threshold effect of the prior art.

When there is considerable ISI, the time dispersion of the second previous bit affects the waveform during the transition between the previous and the current bit. By using different matched filters having filter coefficients that are dependent upon the data content of the bit stream near in time to the subject bit transition, the TOT error due to ISI is ameliorated. The time duration of the matched filters is 4K bits where K is the time duration of the smearing due to the filtering in the transmitter. For example, if the smearing from the bit transition between the third previous bit and the second previous bit extends for 0.9 bits, then the first filter taps of the matched filter corresponding to the first 0.9 bits should be zero to avoid having the third previous bit interfere with the TOT measurement of the bit transition between the previous and current bits.

During a multi-path fade, the error in the TOT measurements may be large. To detect the fade, an AM demodulator 142 measures the amplitude of the received signal. A low-pass boxcar filter 143 operates on the output of the AM demodulator 142 to compute the amplitude of the received signal over the same time interval as the matched filter demodulator 9 thereby forming the signal level waveform. Either a linear or a square law AM demodulator can be used for demodulator 142 to compute the amplitude or the power, respectively, of the received signal. To function as an AM amplitude detector, a device measures the average signal level near in time to the bit transition, wherein the signal level is the signal magnitude raised to a given power. A linear detector uses a power of one. A square law detector uses a power of two. Other powers are readily apparent to those skilled in the art.

The output of the boxcar filter 142 is the emphasis array 12 having the emphasis elements, $e_i$. When an emphasis element is large, there is no fading and the corresponding TOT element is heavily considered in the subsequent calculation of the bit period. When the emphasis element is small, there is considerable fading and the corresponding TOT element is lightly considered, since it may contain an error component due to the signal's low SNR at the bit transition.

The boxcar filter 143 can also be used to detect the presence of co-channel interference. In this mode, the boxcar filter computes both a short-term (as long as the matched filter period) and a very long-term signal power estimate. When a strong co-channel interfering transmitter is present, the short-term average will exceed the long-term average by several dB and this in turn can be used to change the emphasis element to disregard the corresponding TOT element. Other forms of co-channel signal detection techniques can be employed to change elements in the emphasis array 12 to cause elements of the corresponding TOT array 10 to be disregarded. Each element, $e_i$, of the emphasis array 12 is based, for example, on the signal-to-interference ratio, where interference includes both unwanted signals and/or noise.

Another embodiment uses the bit demodulator 71 to compute the probability that a bit is decoded correctly. The probabilities of the bit prior to the bit transition and after the bit transition are combined to form the emphasis array element (shown by a dashed line in FIG. 1) as an alternative to the AM demodulator 142 and boxcar filter 143 in FIG. 1.

In another embodiment, the matched filter demodulator changes the emphasis array so that TOT elements are disregarded if they do not satisfy specific criteria. For example, if a peak detector within the matched filter demodulator 9 does not locate a peak, or if the difference between the actual TOT and the expected TOT is greater than ±R bits, the emphasis element is set to zero so that the corresponding TOT element is ignored. Typically, R is set to 0.4 bits.

Linear regression block 111 operates on the TOT elements to compute the bit period and the bit epoch. The TOT is modeled by $y_i = mx_i + b$, where $y_i$ is the sample number element of the bit transition array 10, $x_i$ is the bit transition number element of the transmission number array 11, m is the bit period with units of samples per bit, and b is the bit epoch with units of samples. The bit period is converted into units of time by dividing by the sample rate. The bit epoch is the sample number of the bit transition corresponding to $x_i=0$. The $x_i=0$ transition is typically defined as a specific bit transition within a synchronization pattern. The bit epoch is converted into absolute time by dividing b by the sample rate and adding the time of sample number zero.

Press develops a linear regression technique to fit a set of N data points $(x_i, y_i)$ to a straight-line model, $y_i=mx_i+b$, to find the slope, m, and the offset, b, that minimizes $$\Sigma[(y_i-mx_i-b)/\sigma_i]^2 \qquad \text{Eq. (1)}$$

where $\sigma_i$ is the standard deviation of $y_i$, the uncertainty associated with each $y_i$ measurement. Accordingly, in the Press linear regression technique, the reciprocal, $1/\sigma_i$, of the standard deviation, $\sigma_i$, modifies the linear regression.

In the present invention, linear regression block 111 uses the emphasis elements $e_i$, of the emphasis array 12 to modify the linear regression that determines bit period and bit epoch. When the emphasis is 0, the TOT does not affect the computation of the bit period nor of the bit epoch. Large positive values of emphasis mean that the TOT is given a large importance in computing the output values of bit period and bit epoch.

The present invention finds the bit period, m, and the bit epoch, b, that minimizes:

$$\Sigma[e_i(y_i-mx_i-b)]^2 \qquad \text{Eq. (2)}$$

where $y_i$ is an element of the bit time-of-transition array 10, $x_i$ is the corresponding element of the bit transition number array 11, and $e_i$ is the corresponding emphasis element of the emphasis array 12. The emphasis element, $e_i$, in the present invention is generically any element determined on a corresponding bit basis for weighting the significance of TOT elements in a regression analysis for bit characteristics measurements.

To avoid numerical round-off error propagation, intermediate arrays are used in:

$$d_i=y_i-m'x_i-b' \quad f_i=x_i-x_{N/2} \qquad \text{Eq. (3)}$$

where N is the number of bit transitions, m' and b' are the coarse estimates of the bit period and bit epoch, $x_{N/2}$ is the midpoint of the bit transition number array, $d_i$ is the difference between the observed TOT and the expected TOT, and $f_i$ is the adjusted bit transition number array.

The following statistical sums are then computed across the N elements of the arrays:

$$S = \Sigma e_i \qquad S_{fd} = \Sigma e_i f_i d_i \qquad \text{Eq. (4)}$$
$$S_f = \Sigma e_i f_i \qquad S_d = \Sigma e_i d_i$$
$$S_{ff} = \Sigma e_i f_i^2 \qquad S_{dd} = \Sigma e_i d_i^2$$

The refined estimates of the bit period, m, and the bit epoch, n, are as follows:

$$m=m'+(SS_{fd}-S_f S_d)/(S_{ff}S-S_f^2) \qquad \text{Eq. (5)}$$

$$b=b'+[S_d+(S_f+x_{N/2}S)(m'-m)]/S \qquad \text{Eq. (6)}$$

In FIG. 1, the demodulated bit values, bit emphasis, bit period, and bit epoch that constitute the bit characteristics measurements are sent by the digital signal processor 4 to a client system 7. The client system 7 uses the bit characteristics measurements to perform client functions. Client functions include but are not limited to transmitter identification, range finding, mobile transmitter location, and sorting.

Figure 2:
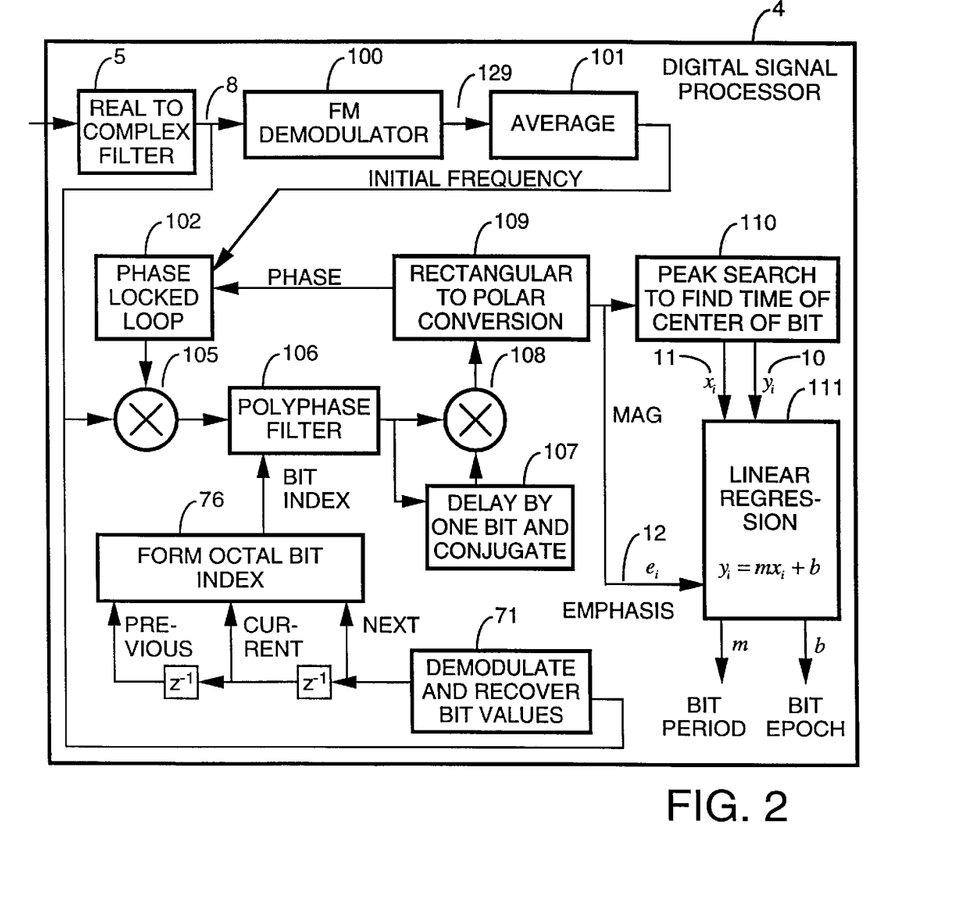
FIG. 2 is a signal processing block diagram for the software in a digital signal processor that operates on a Manchester encoded FSK signal to measure the bit period and bit epoch.

Phase-Locked-Loop Processor—FIG. 2

FIG. 2 is an alternate embodiment of the digital signal processor 4 of FIG. 1. FIG. 2 shows signal processing functions that extract the bit period of a digitally modulated signal used to communicate between mobile cellular telephones and a cellular base-station.

In FIG. 2, a frequency discriminator 100 operates on the complex pre-detection IF signal 8 from real-to-complex filter 5 to produce an FM signal 129 which is averaged in block 101 over the first portion of the signal to produce an initial frequency estimate of the signal center frequency offset. The initial frequency estimate is used by the phase-locked-loop 102 for rapid acquisition. The phase-locked-loop 102 produces a carrier which is used to down convert in multiplier 105 the complex pre-detection IF signal 8 to zero Hz.

The complex pre-detection IF signal 8 is demodulated and the bit sequence is recovered in block 71. The previous, current, and next bits formed through delays $z^{-1}$ are used to form an octal bit index in block 76 which is used to select one of eight sets of filter coefficients for polyphase filter 106. Each set of filter coefficients contains typical values of the complex pre-detection IF waveform that are approximately two bits long in duration. Other durations and bit indices are readily apparent. The polyphase filter 106 cross-correlates the down-converted signal from multiplier 105 with the selected reference filter values selected by the bit index.

The output of the polyphase filter 106 is multiplied in multiplier 108 by its conjugate delayed by one bit in block 107. The complex result from multiplier 108 is converted to a magnitude and phase representation in block 109. If there are residual frequency errors from the down-conversion process, a non-zero phase value will result which is fed back from block 109 to the phase-locked-loop 102 which adjusts the injected carrier's frequency. The magnitude will peak when the down-converted signal from multiplier 105 is time-aligned with the polyphase filter coefficients. A peak search is performed in block 110 to find the sample number of the center of the bit. Interpolation is used in block 110 to refine the estimate to a fraction of a sample.

The peak values at the center of each bit are placed in an emphasis element, $e_i$. The interpolated sample numbers of the peaks are placed in the TOT element, $y_i$. The bit number is placed in the $x_i$ element. Linear regression block 111 is used to estimate the bit period, m, and the bit epoch, b, using the emphasis array to regulate the importance of each element.

The accuracy of the bit period, m, and the bit epoch, b, is dependent upon the signal-to-noise ratio (SNR) and the length, N, of the time-of-transition array. For short messages at low SNR, all of the bits would be used in the time-of-transition array to achieve high accuracy. For long messages, not all of the bits need to be used to measure the bit characteristics. Thus a tradeoff exists between accuracy and processing time which in turn is dependent upon the number of bits used to generate the time-of-transition array.

Figure 3:
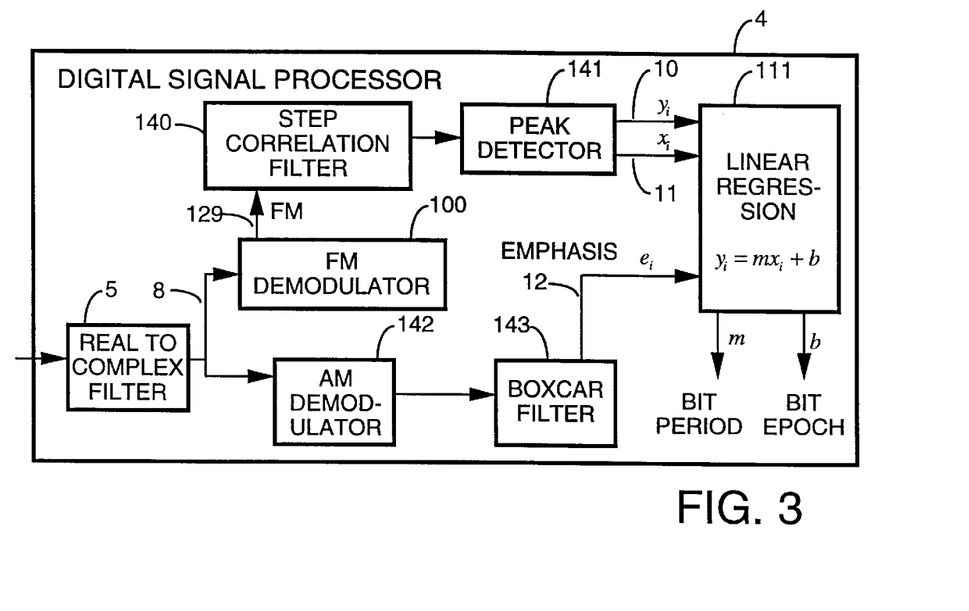
FIG. 3 is a signal processing block diagram of one preferred embodiment of the software in a digital signal processor that operates on AM and FM waveforms.

AM and FM Demodulator Processor—FIG. 3

FIG. 3 shows another embodiment of digital signal processing software that incorporates an FM demodulator 100 to process frequency shift-keyed FSK modulations. The key items in FIG. 3 are an AM demodulator 142 and boxcar filter 143 that form the emphasis array 12 which is used in the linear regression block 111. A step correlation filter 140 operates on the output of an FM demodulator 100 and produces a positive or negative going peak when the filter is time-aligned with a bit transition. An FM demodulator or FM discriminator produces an output signal that is proportional (not necessarily directly proportional) to the difference between the instantaneous frequency of the signal and the center-tuned frequency of the down converter. A peak search is performed by the peak detector 141 to find the sample number of the transition. Peaks are qualified to ensure that they are not too near or too far apart in time. Interpolation is used to refine the estimate to a fraction of a sample and the result is placed in the TOT array 10. The signal processing functions of processor 4 can be allocated to either hardware or software and the allocation will be readily apparent to those skilled in the art.

A boxcar filter 143 with a time duration commensurate with the time span of the step correlation filter 140 operates on the output of an AM demodulator 142. The signal amplitude for each bit transition is placed in an emphasis array 12. Linear regression block 111 uses the time-of-transition array along with the emphasis array to estimate the bit period as previously discussed.

In addition, the matched filter 9 of FIG. 1, peak finder 110 of FIG. 2, peak detector 141 of FIG. 2, or peak detector 141 of FIG. 6 determines the bit transition number, $x_i$, if not available from other means as follows:

$$x_i = \text{int } [(y_i - b')/m' + 0.5] \qquad \text{Eq. (7)}$$

An iterative technique can be used to refine the estimates of m and b by applying equations (7), (3), (4), (5) and (6) over the first few transitions. The new estimates are then used in these equations over the first N/100 transitions. These estimates are then used in these equations over the first N/10 transitions. A final iteration uses all N transitions. This iterative technique avoids bit phase wrapping. Other step sizes and other number of steps are readily apparent.

Reglein discusses a technique of discovering a coarse bit period that minimizes the bit phase wrapping (errors in Eq. (7)). If the coarse bit period estimate is significantly different from the actual bit period, the integer x values in the y=mx+b model may be in error.

Figure 6:
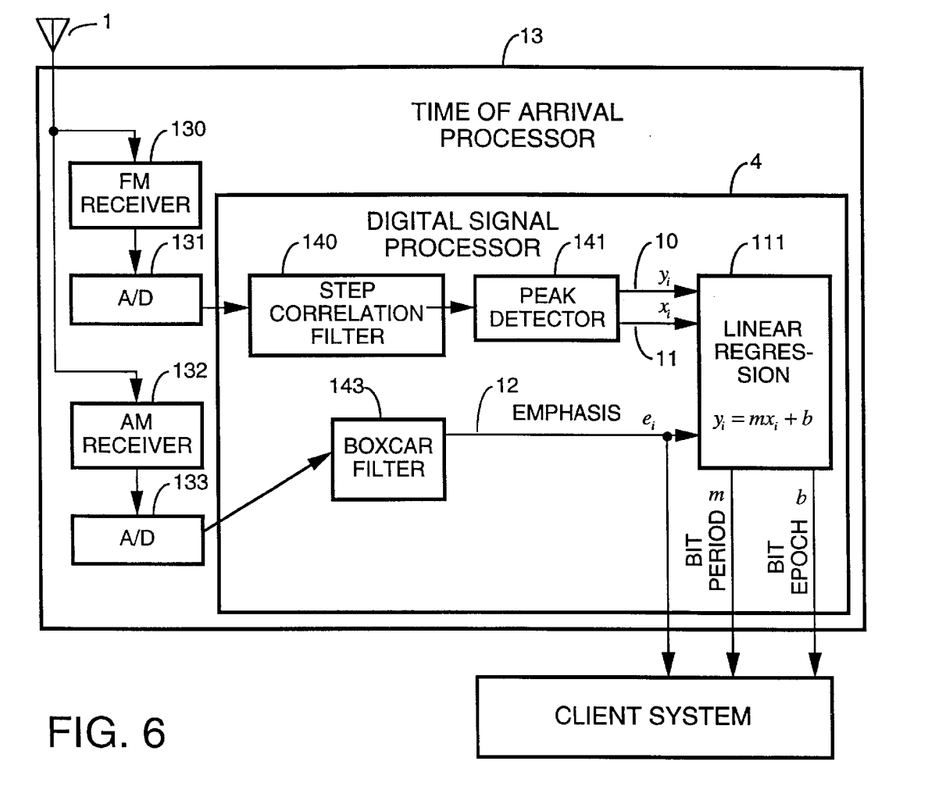
FIG. 6 is a block diagram of another time-of-arrival processor used to measure the bit period and bit epoch in conjunction with a client system and a receive antenna.

Alternate Measurement System—FIG. 6

In FIG. 6, another embodiment of a measurement system includes both an AM receiver 132 and an FM receiver 130 to demodulate the received signal from antenna 1. Receivers 130 and 132 can share common circuits and can be packaged together yielding a single receiver that produces both FM and AM signals. A/D converter 131 operates on the demodulated FM signal and A/D converter 133 operates on the demodulated AM signal. The digitized samples from A/D converter 131 are filtered in step correlation filter 140, peak detected in peak detector 141 to form the bit time-of-transition (TOT) array 10 including the bit time-of-transition elements, $y_i$, and a bit transition number array 11 including the bit transition number elements, $x_i$. The digitized samples from A/D converter 133 are filtered in boxcar filter 143 to form the emphasis array 12 having the emphasis elements, $e_i$. Linear regression block 111 is used to estimate the bit period, m, and the bit epoch, b, using the sample number elements, $y_i$, in the TOT array 10 and the bit number elements, $x_i$, in the bit transition number array 11 using the emphasis elements, $e_i$, from the emphasis vector 12 to regulate the importance of each element.

Figure 4A:
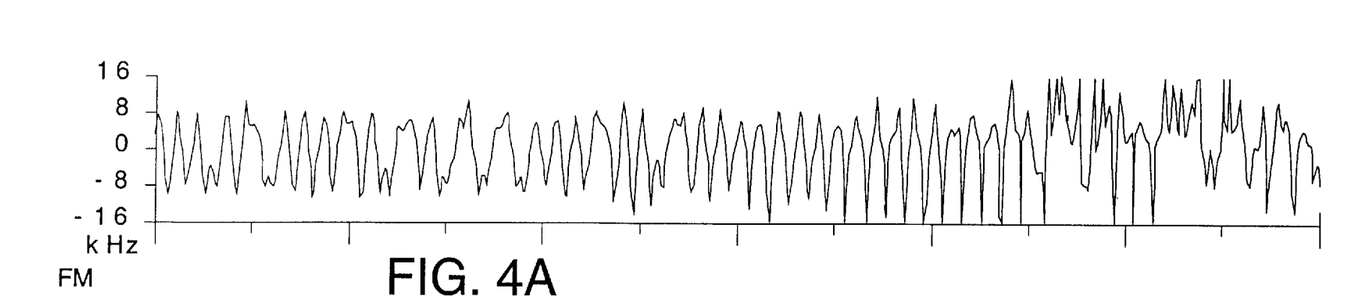
FIG. 4A is a plot of the FM waveform.
Figure 4B:
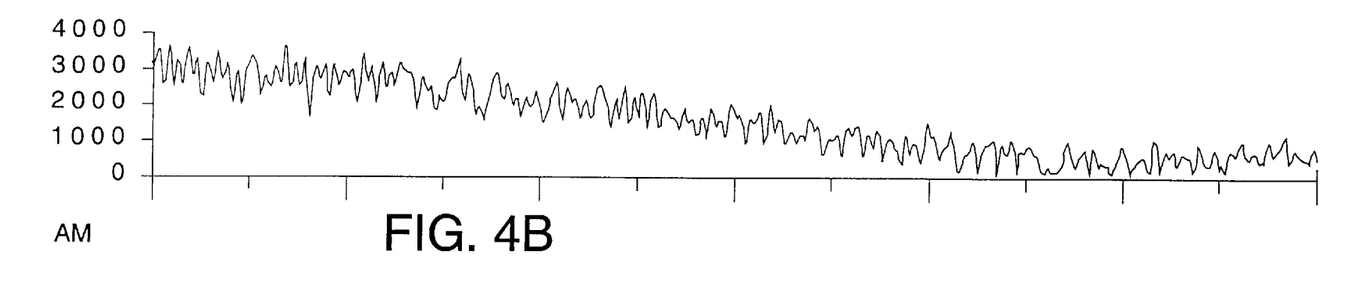
FIG. 4B is a plot of the AM waveform.
Figure 4C:
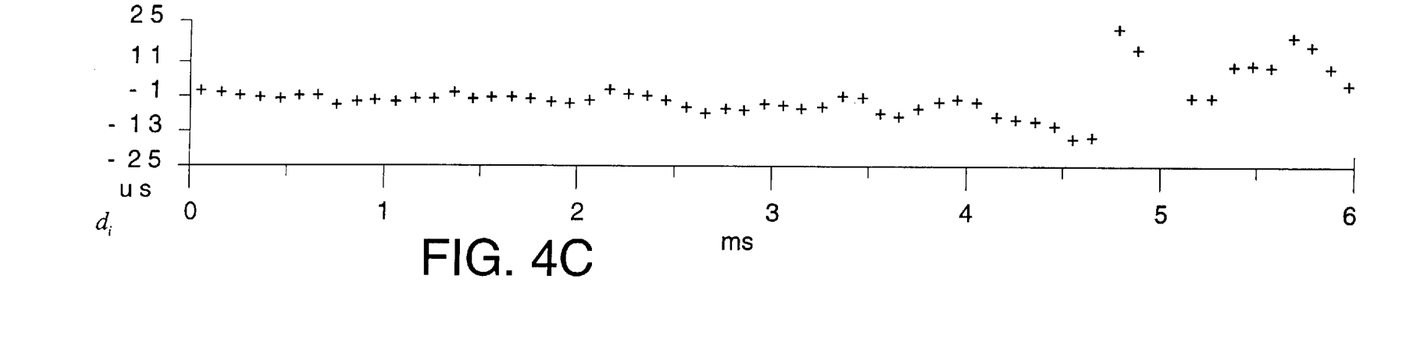
FIG. 4C is a plot of the difference between the actual bit time-of-transition and expected bit time-of-transition for a Manchester encoded FSK signal experiencing time varying multi-path fading.

Typical Measurements—FIG. 4

FIG. 4A is a plot of a portion of the instantaneous frequency (output of an FM demodulator 100) versus time for the digital communication signal from a cellular telephone. FIG. 4B is the output of a boxcar filter 143 operating on the output of an AM demodulator 142. FIG. 4C is the difference between the actual TOT and the expected TOT, a plot of $d_i$ versus $y_i$. The expected TOT assumes a bit epoch of 0 for the first bit of the plot and a bit period of 100 microseconds. FIGS. 4A, 4B, and 4C are all taken from the same six ms portion of the received signal. Note that FIG. 4B shows the signal slowly fading with time, the worst fading occurring at the five ms tick of the plot. Note that the output of the FM demodulator becomes erratic during the fade, especially when the SNR of the intercept drops below the FM threshold. The resultant TOT differences of FIG. 4C show considerable errors between time ticks four ms and six ms. From time ticks zero ms to four ms, the TOT differences are nearly collinear and conform a linear regression model. These figures demonstrate the motivation for emphasizing the TOTs at high SNR and de-emphasizing those at low SNR.

Figure 5:
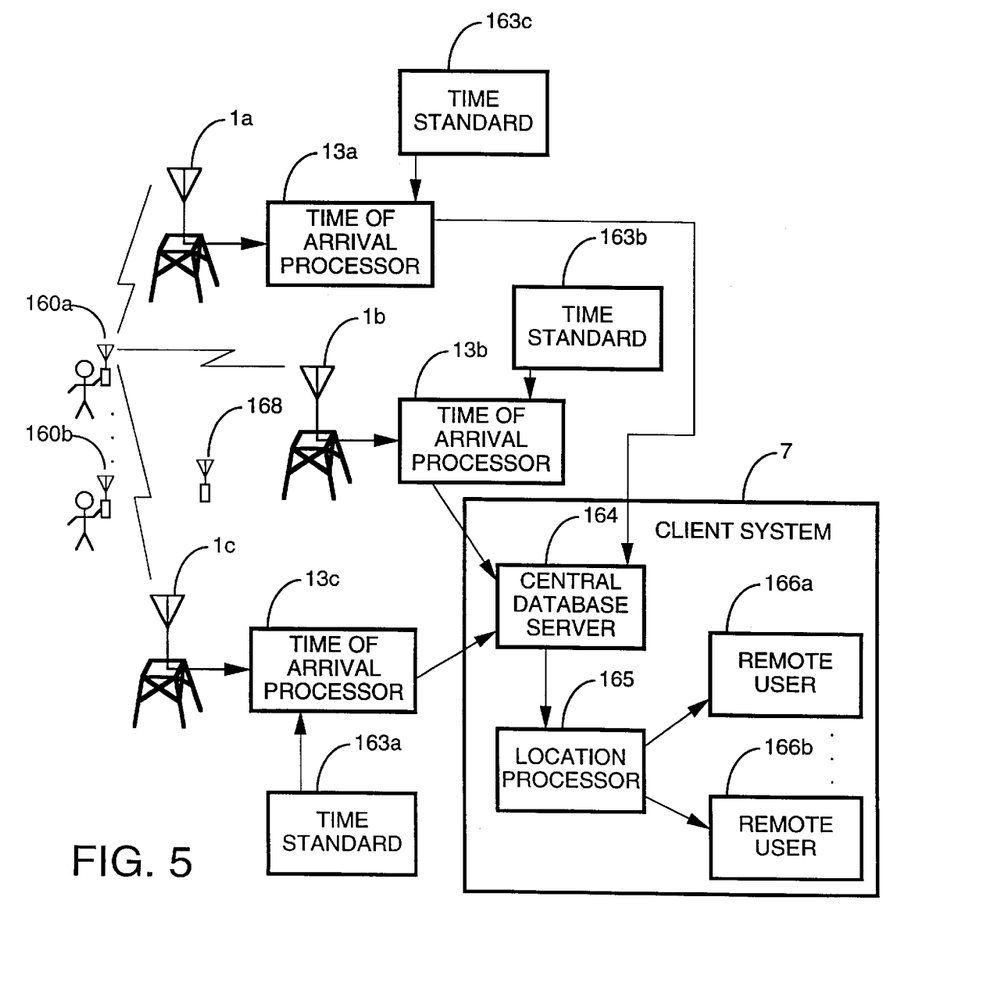
FIG. 5 is a mobile transmitter location system using time-of-arrival processors.

Transmitter Location System—FIG. 5

FIG. 5 shows a transmitter location system based on the time difference of arrival of the bit epoch. One or more transmitters 160, of which transmitters 160a and 160b are representative, transmit a digital communication signal modulated with symbols of information. The signal is intercepted at two or more receive sites that each include an antenna 1 (including antennae 1a, 1b, and 1c), a time of arrival processor 13 (including processors 13a, 13b, and 13c), and a time standard 163 (including time standards 163a, 163b, and 163c). Each antenna 1 receives the signals transmitted from the transmitters 160.

The transmitter location system of FIG. 5 uses a time of arrival processor 13 as shown in FIG. 1 to measure the bit epoch of the received signal. Referring to FIG. 1, the received signal is processed by a down converter 2 which forms the pre-detection IF signal which is sent to the A/D convertor 3 which in turn produces the pre-detection IF samples. These samples are sent to a digital signal processor 4 that finds the TOT and uses linear regression block 111 to process the TOT to determine the bit epoch. The linear regression uses an emphasis factor for each bit transition based of the quality of the pre-detection intermediate frequency signal in the vicinity of the bit transition. The bit demodulator 71 demodulates the signal and extracts the bit values. These bit values are used to determine the transmitter identification code.

Referring to FIG. 5, the time standard 163 is implemented by one of several different methods. For example, a global positioning system (GPS) receiver at each receive site provides an accurate time standard. Each receive site has, for example, a stable clock oscillator that is compared periodically with a single GPS receiver for the entire system. For another example, the receive sites each has an independent stable clock oscillator that provides a relative time to the time of arrival processor which calculates a relative bit epoch. The time difference between two relative bit epochs of a signal from a transmitter at a known location includes the time difference between the clocks at each receive site. By intercepting signals from several fixed transmitters of which transmitter 168 is representative, the clock differences are computed and eliminated from the time difference of arrival calculation of mobile transmitters.

In FIG. 5, the database 164, location processor 165, and remote users 166 constitute the client system 7 for the mobile transmitter location system. The central database 164 stores the bit epoch as computed by each receive site. When a receive site is far away from the transmitter, the measured bit epoch will be later in time than for a receive site that is close to the transmitter. Auxiliary information may also be stored in the database such as the signal quality or the transmitter identification code which may be part of the digital message. The database also stores the locations of the various receive sites.

The location processor 165 receives requests from remote users 166 to determine the location of a transmitter. The location processor 165 retrieves the bit epoch data from the database and computes the time difference of arrival of the signal to the various receive sites. The most probable transmitter location is computed based on the time difference of arrival, the speed of RF waves, and the location of the various receive sites.

When only two receive sites intercept the transmission from the transmitter, the most probable transmitter locations are not represented by a single point but are represented by a hyperbolic surface. For ground based transmitters, the most probable transmitter locations are represented by a hyperbola formed by the intersection of that hyperbolic surface and the surface of the earth.

The transmitter location is then forwarded to remote users 166, of which remote users 166a and 166b are representative. The location processor 165 incorporates an error reduction technique that reduces systematic errors by taking into account the bit epochs of transmitted signals from one or more transmitters 168 at known locations.

There are several advantages of the transmitter location system of FIG. 5. The interface between the various receive sites of the FIG. 5 system does not require a high speed communication link. The interface between the time of arrival processor and the database contains the bit epoch (about 100 bits) rather than A/D converter samples (about 100,000 bits). The database does not store the location of the transmitter but rather stores the bit epochs from the various receive sites. The location processor block 165 can be distributed between several different computers to reduce the workload and a distributed processor can be at a remote user 166 location.

The transmitter location system shown in FIG. 5 can be used to locate mobile cellular telephones (for example, each telephone having a mobile transmitter 160) which transmit RECC signals to the various ground based receive sites (for example, BTS sites each having an antenna 1) which in turn measure bit epoch.

While the invention has been particularly shown and described with reference to preferred embodiments thereof it will be understood by those skilled in the art that various changes in form and details may be made therein without departing from the spirit and scope of the invention.

I claim:

1. An apparatus for measuring bit characteristics of a digitally modulated signal including a plurality of symbols comprising:
   time-of-transition means for extracting symbol time-of-transition elements from said digitally modulated signal to form a symbol time-of-transition array;
   emphasis means for determining emphasis elements from said digitally modulated signal to form an emphasis array with each said emphasis element corresponding to a corresponding time-of-transition element; and
   processing means for using linear regression on the said symbol time-of-transition array with said emphasis array to determine said bit characteristics.

2. The apparatus of claim 1 wherein said digitally modulated signal has a signal level and said apparatus includes,
   an amplitude detector operating on said signal for generating a signal level waveform, and said emphasis means further operates to determine each emphasis element based on the signal level waveform such that each said time-of-transition element and each said corresponding emphasis element are both derived from at least a common portion of said signal.

3. The apparatus of claim 1 wherein said digitally modulated signal has a signal-to-interference ratio and said apparatus includes,
   means for measuring the signal-to-interference ratio, and
   said emphasis means further operates to determine each emphasis element based on the signal-to-interference ratio such that each said time-of-transition element and each said corresponding emphasis element are both derived from at least a common portion of said signal.

4. The apparatus of claim 1 wherein each of said symbols of said digitally modulated signal has one of plural possible symbol values and wherein said emphasis means includes,
   demodulation means operative for each particular symbol for selecting a particular symbol value that is most likely for said particular symbol,
   estimating means for estimating for each particular symbol a particular probability that the particular symbol value is not in error,
   means responsive to said particular probability for determining said emphasis element.

5. The apparatus of claim 1 wherein said digitally modulated signal has data content and said apparatus includes,
   demodulation means for recovering said data content of the digitally modulated signal, and
   said time-of-transition means includes reference filters for providing dynamically in time coefficients based on the data content of the received signal and includes a matched filter for receiving said coefficients.

6. The apparatus of claim 1 wherein said time-of-transition means includes receiving means for receiving a signal from a transmitter.

7. The apparatus of claim 6 wherein the receiving means includes an antenna, a down converter, and an A/D converter.

8. The apparatus of claim 6 wherein the receiving means includes an antenna, a radio receiver with FM and AM outputs, and means of performing A/D conversion of both said FM and AM outputs.

9. The apparatus of claim 1 wherein said digitally modulated signal is transmitted by a transmitter and said apparatus further includes a client system that identifies said transmitter based upon said bit characteristics.

10. An apparatus for measuring a symbol period of a digitally modulated signal including a plurality of symbols comprising:
    time-of-transition means for extracting symbol time-of-transition elements from said digitally modulated signal to form a symbol time-of-transition array;
    emphasis means for determining emphasis elements from said digitally modulated signal to form an emphasis array with emphasis elements corresponding the time-of-transition elements of the transition array; and
    processing means for using linear regression on the said symbol time-of-transition array with said emphasis array to determine said symbol period.

11. An apparatus for measuring a symbol epoch of a digitally modulated signal including a plurality of symbols comprising:
    time-of-transition means for extracting symbol time-of-transition elements from said digitally modulated signal to form a symbol time-of-transition array;

emphasis means for determining emphasis elements from said digitally modulated signal to form an emphasis array with emphasis elements corresponding to the time-of-transition elements of the transition array; and processing means for using linear regression on the said symbol time-of-transition array with said emphasis array to determine said symbol epoch.

12. A transmitter location system comprising:

one or more transmitters, each transmitter transmitting a signal modulated with symbols of information, measuring means at each of two or more receive sites located at two or more receive site locations, respectively, each measuring means at a receive site determining a symbol epoch as a time when a specific one of said symbols arrives at said receive site, database means for storing information including a symbol epoch from each of said two or more receive sites, and location means for determining for each particular one of said one or more transmitters a particular location for said particular one of said one or more transmitters based on the difference in the symbol epochs retrieved from the database for said particular one of said one or more transmitters and said locations of the receive sites.

13. The apparatus of claim 12 further comprising:

distribution means for communicating the particular location for each particular one of said one or more transmitters to users at one or more remote locations.

14. The apparatus of claim 12 wherein said one or more transmitters are mobile cellular telephones, said signal modulated with symbols of information is a reverse control channel transmission, and each said receive site is ground based.

15. The apparatus of claim 12 wherein said measuring means at a receive site further includes:

receiving means for receiving said signal and producing therefrom a pre-detection intermediate frequency signal, processing means operating on the pre-detection intermediate frequency signal for finding symbol times of transitions when modulation of the pre-detection intermediate frequency signal changes due to a symbol transition between adjacent symbols, linear regression means operating on the symbol times of transitions for determining said symbol epoch.

16. The apparatus of claim 15 wherein the linear regression means further includes:

means for finding an emphasis factor for each symbol time of transition based on the quality of the pre-detection intermediate frequency signal in the vicinity of the symbol transition.

17. The apparatus of claim 12 wherein the measurement means includes a time standard derived from one or more global positioning system (GPS) receivers.

18. The apparatus of claim 12 wherein the location means further includes:

error reduction means for reducing systematic errors by taking into account the symbol epochs of signals from one or more known transmitters at known locations.

19. The apparatus of claim 12 wherein said measuring means further includes:

demodulation means to recover the symbols and decoding means to extract bits from the symbols.

20. The apparatus of claim 19 wherein the database also includes means to store one or more of said bits.

21. An apparatus for measuring bit characteristics of a digitally modulated signal where the digitally modulated signal has a signal level, and data content and includes a plurality of symbols where each of said symbols has one of plural possible symbol values, said apparatus comprising:

demodulation means for recovering said data content of the digitally modulated signal, time-of-transition means for extracting symbol time-of-transition elements from said digitally modulated signal to form a symbol time-of-transition array, said time-of-transition means including reference filters for providing dynamically in time coefficients based on said data content of the received signal and including a matched filter receiving said coefficients and responsively extracting said symbol time-of-transition elements based on said coefficients, an amplitude detector operating on said signal for generating a signal level waveform, emphasis means for determining emphasis elements from said digitally modulated signal to form an emphasis array with each said emphasis element corresponding to a corresponding time-of-transition element, said emphasis means operating to determine each emphasis element based on the signal level waveform such that each said time-of-transition element and each said corresponding emphasis element are both derived from at least a common portion of said signal, and processing means for using linear regression on the said symbol time-of-transition array with said emphasis array to determine symbol period and symbol epoch for said bit characteristics.

22. An apparatus for measuring bit characteristics of a digitally modulated signal including a plurality of symbols comprising:

demodulator means for extracting symbol time-of-transition elements, $y_i$, from said digitally modulated signal to form a symbol time-of-transition array and for extracting symbol transition number elements, $x_i$, from said digitally modulated signal to form a symbol number array;

emphasis means for determining emphasis elements, $e_i$, from said digitally modulated signal to form an emphasis array with each said emphasis element corresponding to a corresponding time-of-transition element; and processing means for using linear regression on the said symbol time-of-transition array with said emphasis array to determine said bit characteristics wherein said processing means finds the symbol period, m, and the symbol epoch, b, by minimizing $$\Sigma[e_i(y_i - mx_i - b)]^2.$$

23. The apparatus of claim 22 wherein said processing means minimizes $$\Sigma[e_i(y_i - mx_i - b)]^2$$

to avoid numerical round-off error propagation for a number of symbol transitions, N, by forming difference elements, $d_i$, in a difference array and adjusted symbol transition number elements, $f_i$, in an adjusted symbol transition number array as follows:

$$d_i = y_i - m'x_i - b' \quad f_i = x_i - x_{N/2}$$

where, m' and b' are the coarse estimates of the symbol period and symbol epoch and where $x_{N/2}$ is the midpoint of the symbol transition number array, computing across the N elements of the arrays:

$$S = \Sigma e_i \qquad S_{fd} = \Sigma e_i f_i d_i$$
$$S_f = \Sigma e_i f_i \qquad S_d = \Sigma e_i d_i$$
$$S_{ff} = \Sigma e_i f_i^2 \qquad S_{dd} = \Sigma e_i d_i^2$$

to determine refined estimates of the symbol period, m, and the symbol epoch, b, as follows:

$$m = m' + (S S_{fd} - S_f S_d)/(S_{ff} S - S_f^2)$$
$$b = b' + [S_d + (S_f + x_{N/2} S)(m' - m)]/S.$$

24. A method for measuring bit characteristics of a digitally modulated signal including a plurality of symbols comprising:
- extracting symbol time-of-transition elements, $y_i$, from said digitally modulated signal to form a symbol time-of-transition array and extracting symbol transition number elements, $x_i$, from said digitally modulated signal to form a symbol number array;
- determining emphasis elements, $e_i$, from said digitally modulated signal to form an emphasis array with each said emphasis element corresponding to a corresponding time-of-transition element; and
- processing using linear regression on the said symbol time-of-transition array and said symbol number array with said emphasis array to determine said bit characteristics.

25. The method of claim 24 wherein said processing means finds the period, m, and the epoch, b, by minimizing $$\Sigma [e_i(y_i - mx_i - b)]^2.$$

26. The of method claim 25 wherein said processing minimizes $$\Sigma [e_i(y_i - mx_i - b)]^2$$

to avoid numerical round-off error propagation for a number of symbol transitions, N, by
- forming difference elements, $d_i$, in a difference array and adjusted symbol transition number elements, $f_i$, in an adjusted symbol transition number array as follows:

$$d_i = y_i - m'x_i - b' f_i = x_i - x_{N/2}$$

where, m' and b' are the coarse estimates of the symbol period and symbol epoch and where $x_{N/2}$ is the midpoint of the symbol transition number array, computing across the N elements of the arrays:

$$S = \Sigma e_i \qquad S_{fd} = \Sigma e_i f_i d_i$$
$$S_f = \Sigma e_i f_i \qquad S_d = \Sigma e_i d_i$$
$$S_{ff} = \Sigma e_i f_i^2 \qquad S_{dd} = \Sigma e_i d_i^2$$

to determine refined estimates of the symbol period, m, and the symbol epoch, b, as follows:

$$m = m' + (S S_{fd} - S_f S_d)/(S_{ff} S - S_f^2)$$
$$b = b' + [S_d + (S_f + x_{N/2} S)(m' - m)]/S.$$

\* \* \* \* \*